(12) United States Patent
Chikugo

(10) Patent No.: US 6,339,226 B1
(45) Date of Patent: Jan. 15, 2002

(54) IMAGE RECORDING MEDIUM FEEDING DEVICE

(75) Inventor: Hiroshi Chikugo, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/450,736

(22) Filed: Nov. 30, 1999

(30) Foreign Application Priority Data

Nov. 30, 1998 (JP) ............................................. 10-340338

(51) Int. Cl.[7] .......................... G03B 42/02; B65H 5/06
(52) U.S. Cl. ....................... 250/589; 271/272; 271/274
(58) Field of Search ................................ 250/589, 590; 271/272, 274, 264

(56) References Cited

U.S. PATENT DOCUMENTS

| | | | | |
|---|---|---|---|---|
| 4,729,557 A | * | 3/1988 | Kiyohara | 271/272 |
| 4,780,767 A | * | 10/1988 | Ohta et al. | 358/296 |
| 4,840,369 A | * | 6/1989 | Takahashi | 271/276 |
| 4,996,542 A | * | 2/1991 | Ohgoda et al. | 346/108 |
| 5,044,621 A | * | 9/1991 | Sachs et al. | 271/11 |
| 5,743,519 A | * | 4/1998 | Chang et al. | 271/10.11 |
| 6,055,410 A | * | 4/2000 | Marumoto et al. | 399/392 |
| 6,123,331 A | * | 9/2000 | Vackier et al. | 271/233 |
| 2001/0017357 | * | 8/2001 | Chikugo | 250/589 |
| 2001/0019115 | * | 9/2001 | Tajima | 250/588 |

* cited by examiner

Primary Examiner—Constantine Hannaher
Assistant Examiner—Albert Gagliardi
(74) Attorney, Agent, or Firm—Sughrue Mion, PLLC

(57) ABSTRACT

An image recording medium feeding device has a feed system for feeding a stimulable phosphor sheet using opposite longitudinal marginal edges thereof, which are an image-free area, and a guide mechanism positioned in a curved feed path for contacting a substantially central area of the stimulable phosphor sheet and guiding the stimulable phosphor sheet along the curved feed path. The guide mechanism comprises a roller and a cushioning damper disposed around the roller. The stimulable phosphor sheet is prevented from bulging at its central area when it is fed into the feed path using the opposite longitudinal marginal edges of the stimulable phosphor sheet.

6 Claims, 5 Drawing Sheets

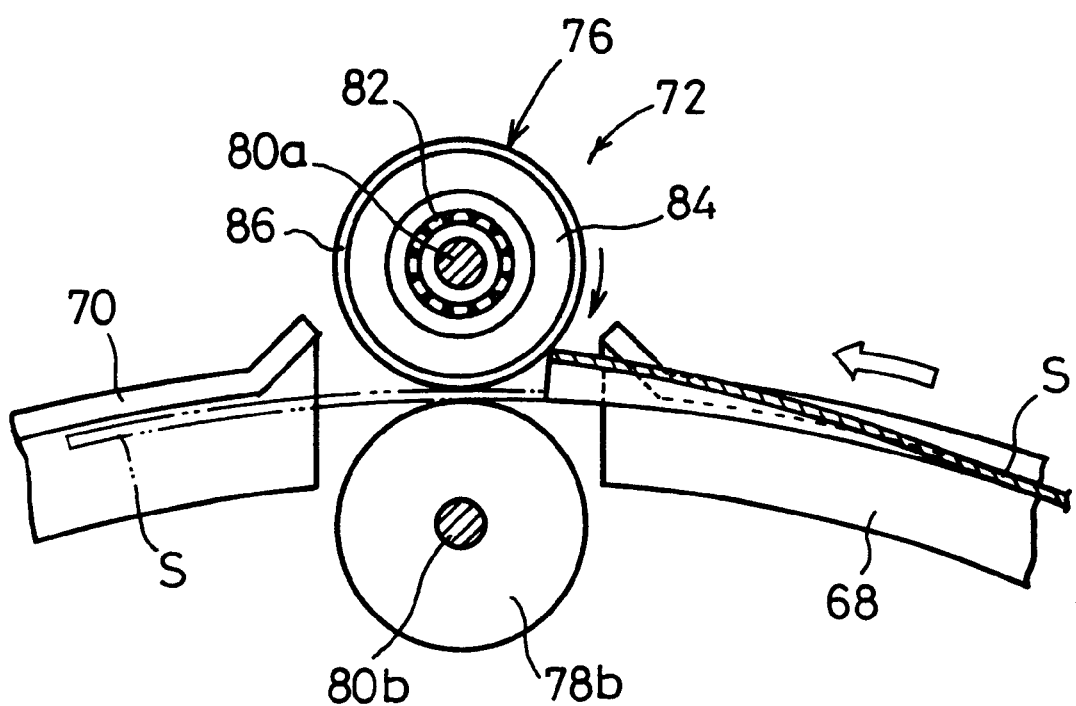
F I G. 5

IMAGE RECORDING MEDIUM FEEDING DEVICE

BACKGROUND OF THE INVENTION

1. Field of the Invention

The present invention relates to an image recording medium feeding device for feeding an image recording medium such as a stimulable phosphor sheet or the like.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when ex-posed to an applied radiation such as X-rays, α-rays, γ-rays, electron beams, ultraviolet radiation, or the like stores a part of the energy of the radiation, and, when subsequently exposed to applied stimulating rays such as visible light, emits light in proportion to the stored energy of the radiation. Usually, a sheet provided with a layer of the stimulable phosphor, or a stimulable phosphor sheet, is used in the art for ease of handling.

The above known system includes a recording section for recording radiation image information of a subject on a stimulable phosphor sheet, a reading section for photoelectrically reading the radiation image information recorded on the stimulable phosphor sheet by applying stimulating rays to the stimulable phosphor sheet, and an erasing section for erasing remaining radiation image information from the stimulable phosphor sheet after the recorded radiation image information has been read. The recording section, the reading section, and the erasing section are incorporated together in a radiation image information reading apparatus in which the stimulable phosphor sheet is circulated or reciprocated.

The stimulable phosphor sheet is coated on its surface with a protective material such as silicone for protection against damage. When the stimulable phosphor sheet is cyclically used in the radiation image information reading apparatus, the surface of the stimulable phosphor sheet is frequently brought into contact with a feeding system in the apparatus, causing the coated protective material to be scraped off due to wear. Therefore, the surface of the stimulable phosphor sheet tends to be smeared or damaged, with the result that the stimulable phosphor sheet may be unable to produce high-quality radiation image information.

One solution is to employ a feeding system for gripping opposite longitudinal marginal edges, which are an image-free area, of a stimulable phosphor sheet to feed the stimulable phosphor sheet. Specifically, the opposite longitudinal marginal edges of the stimulable phosphor sheet are gripped by paired rollers, which are rotated to deliver the stimulable phosphor sheet, while the opposite longitudinal marginal edges are being guided by guide members.

The radiation image information reading apparatus has a plurality of curved feed paths along which the stimulable phosphor sheet is curved when it is fed. When the stimulable phosphor sheet is fed along a curved feed path by a pair of rollers gripping the opposite longitudinal marginal edges of the stimulable phosphor sheet, the stimulable phosphor sheet is liable to bulge in its central region. Accordingly, it is difficult to feed the stimulable phosphor sheet smoothly along a desired curved feed path.

In particular, the stimulable phosphor sheet cannot smoothly be fed by pairs of rollers gripping its opposite longitudinal marginal edges along a sharply curved feed path through 90° or more, for example, 180°, which is often employed in efforts to reduce the size of the radiation image information reading apparatus.

The above problem also occurs with a radiation image information reading apparatus which comprises a loading section for loading a cassette housing a stimulable phosphor sheet with radiation image information recorded thereon, a reading section for photoelectrically reading the radiation image information recorded on the stimulable phosphor sheet by applying stimulating rays to the stimulable phosphor sheet, and an erasing section for erasing remaining radiation image information from the stimulable phosphor sheet after the recorded radiation image information has been read.

Furthermore, various other image recording mediums such as a photographic film or the like in general use cannot smoothly be fed along sharply curved feed paths by pairs of rollers that grip their opposite longitudinal marginal edges only in order to protect recorded areas.

SUMMARY OF THE INVENTION

It is a major object of the present invention to provide an image recording medium feeding device which is of a relatively simple structure for smoothly and reliably feeding an image recording medium along a curved feed path using opposite longitudinal edges of the image recording medium.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a cross-sectional view taken along line V—V of FIG. 4.

DESCRIPTION OF THE PREFERRED EMBODIMENT

Figure 1:
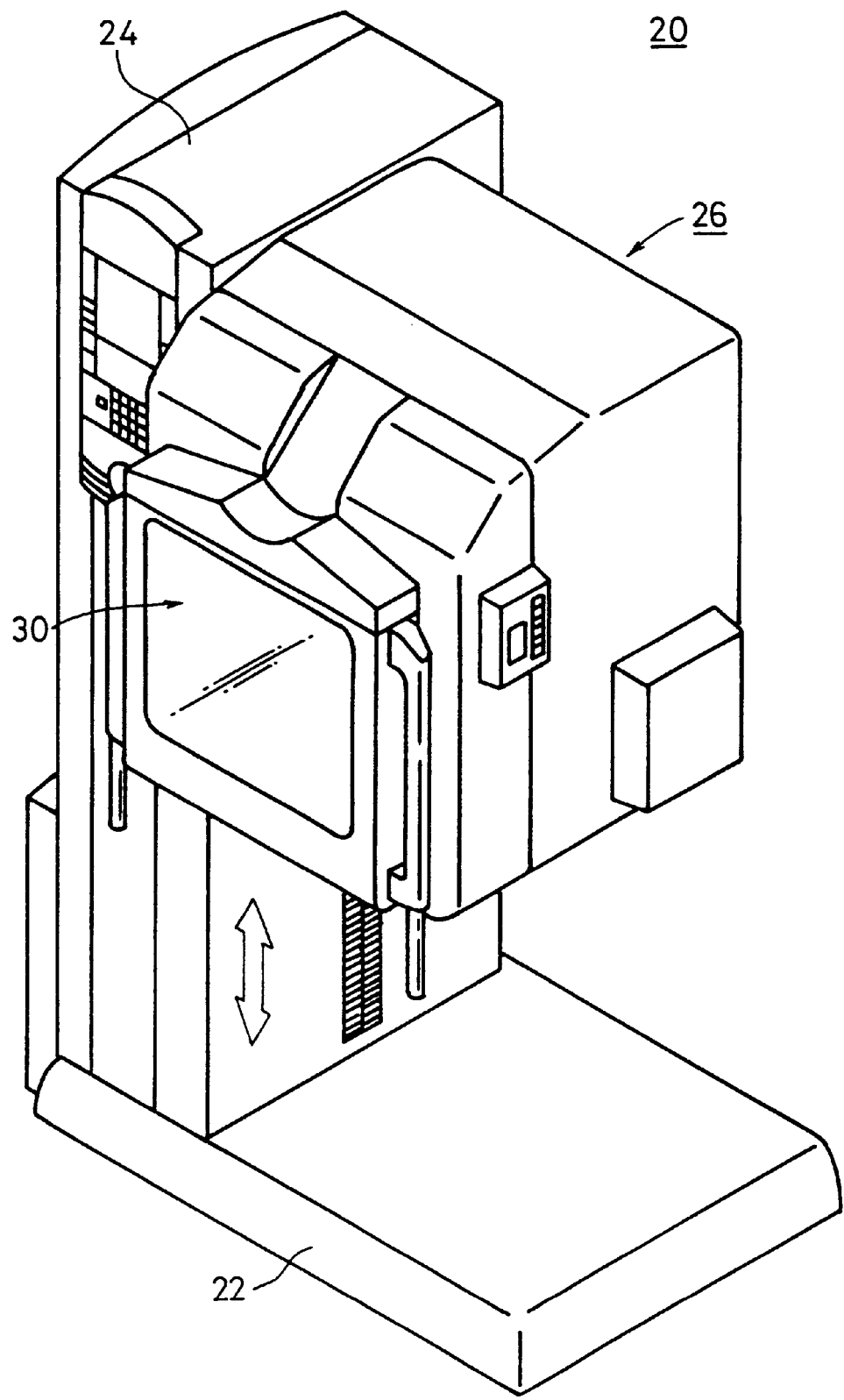
FIG. 1 is a perspective view of a radiation image information reading apparatus which incorporates an image recording medium feeding device according to the present invention.
Figure 2:
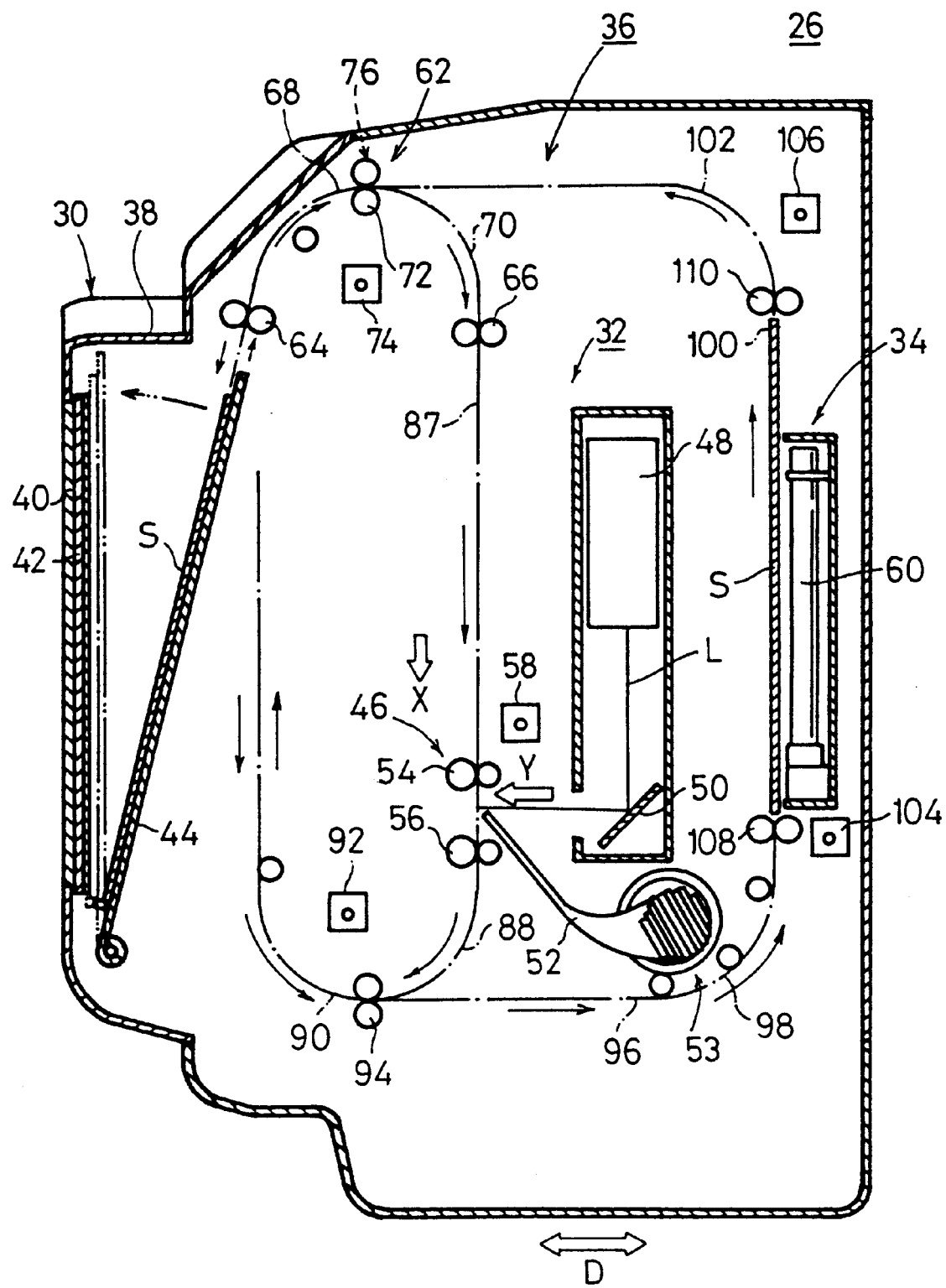
FIG. 2 is a vertical cross-sectional view of an internal structure of the Image recording medium feeding device.

FIG. 1 shows in perspective a radiation image information reading apparatus 20 which incorporates an image recording medium feeding device according to the present invention. FIG. 2 shows in vertical cross section an internal structure of the radiation image information reading apparatus 20.

As shown in FIG. 1, the radiation image information reading apparatus 20 has a lifting unit 24 mounted upwardly on a base 22. The radiation image information reading apparatus 20 has a main assembly 26 vertically movably supported on the lifting unit 24 by an actuator (not shown) including a ball screw, a cylinder, etc. The radiation image information reading apparatus 20 operates by circulating two stimulable phosphor sheets (image recording mediums) S in the main assembly 26 for repeatedly recording and reading radiation image information of subjects (not shown) on and from the stimulable phosphor sheets S.

As shown in FIG. 2, the main assembly 26 includes an exposure unit 30 for temporarily recording radiation image information of a subject on a stimulable phosphor sheet S, an image information reading unit 32 for applying a laser beam L as stimulating rays to the stimulable phosphor sheet W with the recorded radiation image information to photo-electrically reading the recorded radiation image information, an erasing unit 34 for erasing remaining image information from the stimulable phosphor sheet S after the recorded image information has been read, and a circulatory feed system (image recording medium feeding device) 36 for circulating the two stimulable phosphor sheets S.

The exposure unit 30 has an exposure cover 38 mounted on a front face of the main assembly 26 and supporting a photo timer 40 and a gripper arranged successively from the subject (not shown), and a swingable presser plate 44 disposed near the grid 42 for holding the stimulable phosphor sheet S in an exposure position.

The image information reading unit 32 is disposed substantially parallel to the exposure unit 30. The image information reading unit 32 comprises an auxiliary scanning feed means 46 for feeding the stimulable phosphor sheet S vertically downwardly in an auxiliary scanning direction indicated by the arrow X, and a laser beam applying means 48 for applying a laser beam L as stimulating rays to the stimulable phosphor sheet S which is being fed in the auxiliary scanning direction, substantially horizontally in the direction indicated by the arrow Y and scanning the stimulable phosphor sheet S with the laser beam L in a main scanning direction perpendicular to the auxiliary scanning direction.

The laser beam applying means 48 emits the laser beam L downwardly. The image information reading unit 32 includes an optical system 50 for directing the laser beam L substantially horizontally in the direction indicated by the arrow Y to the stimulable phosphor sheet S. A light guide 52 for collecting light emitted from the stimulable phosphor sheet S when the laser beam L is applied thereto is disposed in the vicinity of the beam applying position. A photomultiplier (not shown) is connected to the light guide 53, making up a reading means 53.

The auxiliary scanning feed means 46 has first and second roller pairs 54, 56 that are spaced a predetermined distance from each other in the vertical direction indicated by the arrow X. The first and second roller pairs 54, 56 are of narrow dimensions for guiding the opposite longitudinal marginal edges of the stimulable phosphor sheet S where no radiation image information is recorded and read. The first and second roller pairs 54, 56 are synchronously rotatable by a transmitting means (not shown) comprising a belt and pulleys and operatively coupled to a motor 58.

The erasing unit 34 is disposed substantially parallel to the exposure unit 30 and the image information reading unit 32, and extends vertically. The erasing unit 34 has a plurality of vertically extending erasing light sources 60. The erasing light sources 60 may instead extend horizontally.

The circulatory feed system 36 is disposed between the exposure unit 30 and the image information reading unit 32, and has a turning feed system 62 for turning the stimulable phosphor sheet S through 180 and feeding the stimulable phosphor sheet S from the exposure unit 30 to the image information reading unit 32. The turning feed system 62 comprises a pair of curved guide plates 68, 70 disposed between a roller pair 64 positioned near a sheet outlet of the exposure unit 30 and a roller pair 66 disposed above the image information reading unit 32, and a roller pair 72 disposed above the curved guide plates 68, 70. The roller pairs 64, 66 are rotatable by a motor 74. The roller pairs 64, 66 and the curved guide plates 68, 70 are arranged to grip and guide the opposite longitudinal marginal edges of the stimulable phosphor sheet S.

Figure 3:
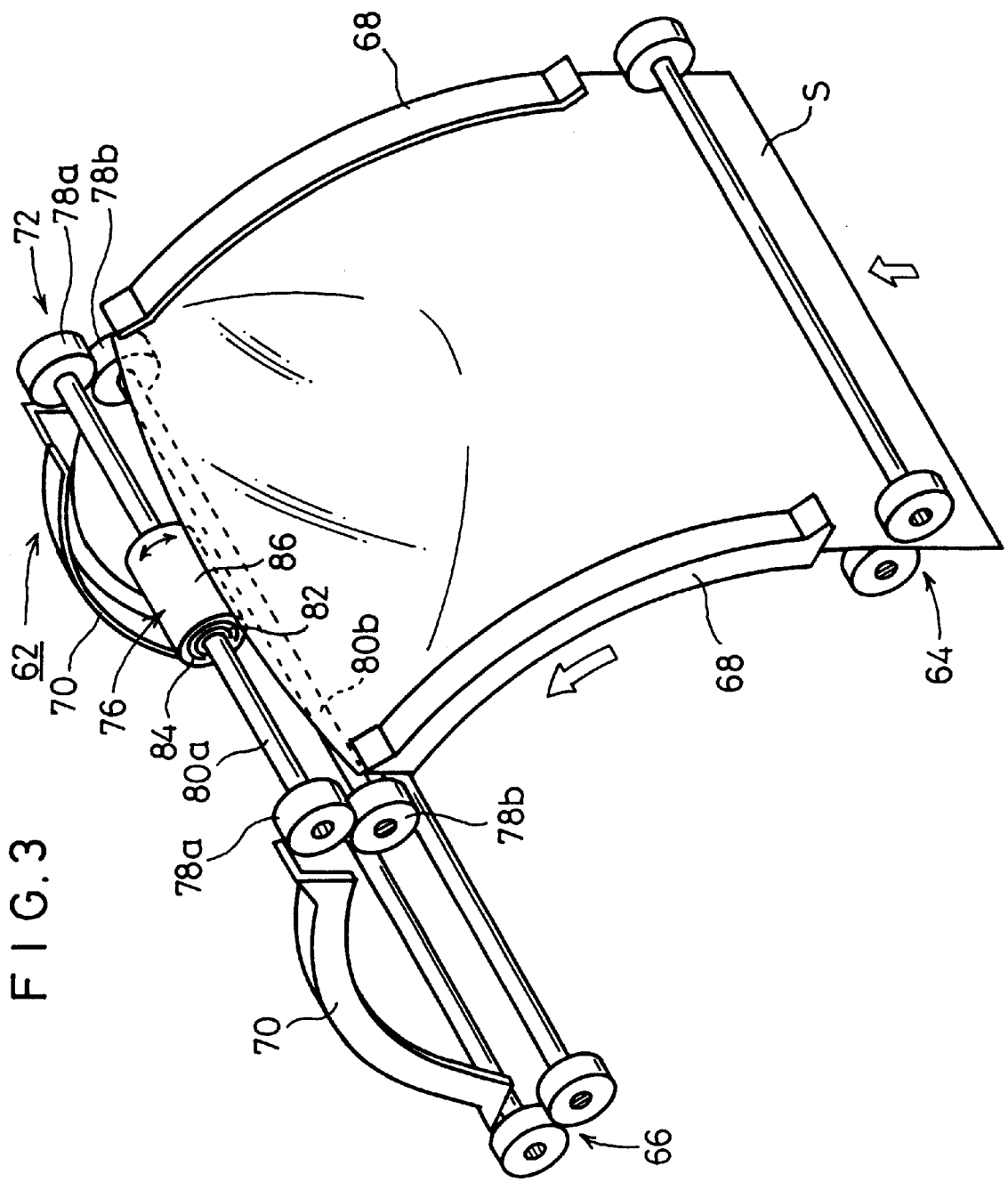
FIG. 3 is a perspective view of the image recording medium feeding device.
Figure 4:
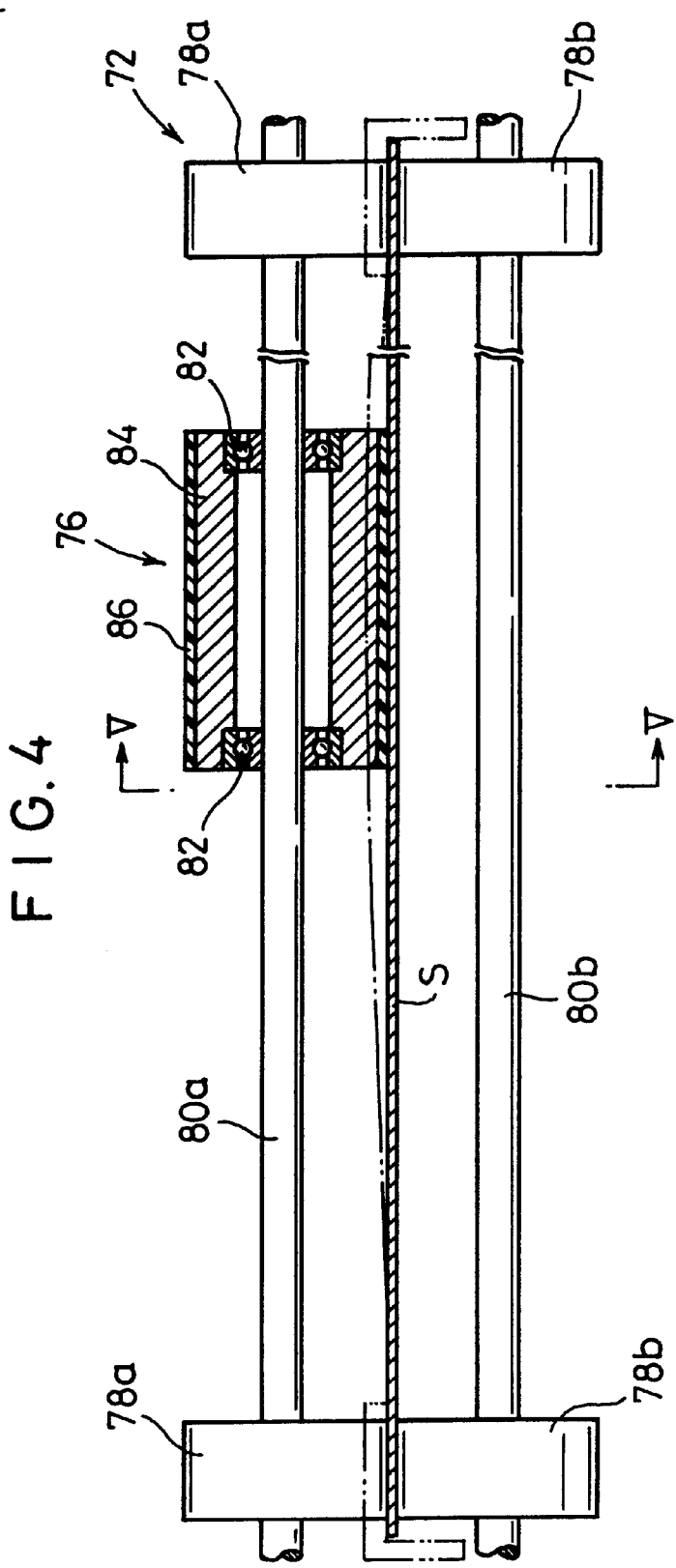
FIG. 4 is a fragmentary elevational view, partly in cross section, of the image recording medium feeding device.

As shown in FIGS. 3 and 4, a guide means 76 is positioned on a curved feed path for guiding the stimulable phosphor sheet S along the curved feed path by contacting a substantially central area of the stimulable phosphor sheet S as it is fed by the turning feed system 62.

The guide means 76 is mounted on the roller pair 72 which comprises laterally spaced pairs of rubber rollers 78a, 78b for gripping the opposite longitudinal marginal edges of the stimulable phosphor sheet S, and a pair of shafts 80a, 80b each interconnecting the rubber rollers 78a, 78b. The guide means 76 comprises a roller 84 rotatably mounted on the shaft 80a by a bearing 82, and a damper 86 disposed around the roller 84 (see FIGS. 3 through 5). The damper 86 is made of a cushioning non-woven fabric of polypropylene, for example, for preventing the surface of the stimulable phosphor sheet S from being smeared or damaged.

As shown in FIG. 2, a pair of guide plates 87 for guiding the opposite longitudinal marginal edges of the stimulable phosphor sheet S extends downwardly from the roller pair 66 toward the image information reading unit 32. Curved guide plates 88, 90 are disposed at a sheet outlet of the image information reading unit 32 for guiding the opposite longitudinal marginal edges of the stimulable phosphor sheet S downwardly and then upwardly via a curved feed path. The curved guide plate 90 has a straight vertical end extending upwardly.

A roller pair 94 rotatable by a motor 92 is disposed between the curved guide plates 88, 90. A horizontal guide plate 96 extends from a position near the roller pair 94 toward the light guide 52. A vertical guide plate 100 extends upwardly from a curved guide plate 98 which is positioned near an end of the guide plate 96. The guide plate 100 extends along the erasing unit 34 and has an upper end positioned near a curve guide plate 102 whose end is positioned near the curved guide plates 68. Roller pairs 108, 110 rotatable respectively by motors 104, 106 are disposed below and above the guide plate 100. Guide means identical to the guide means 76 are associated with the roller pair 94 and other curved feed paths.

Operation of the radiation image information reading apparatus 20 will be described below.

Two stimulable phosphor sheets S are housed in the main assembly 26. When one of the stimulable phosphor sheets S is placed in the exposure unit 30, the other stimulable phosphor sheet S is positioned in a standby mode in the erasing unit 34 (see FIG. 2). In the exposure unit 30, the presser plate 44 is turned toward a subject (not shown) to hold the stimulable phosphor sheet S in the exposure position. The radiation image information of a subject is recorded on the stimulable phosphor sheet S thus held in the exposure position.

The stimulable phosphor sheet S exposed to the radiation image information is then turned inwardly together with the presser plate 44, and thereafter delivered toward the roller pair 64. The roller pair 64 which is rotated by the motor 74 feeds the stimulable phosphor sheet S to the turning feed system 62. In the turning feed system 62, the curved guide plates 68, 70 and the guide rollers 72 guide the stimulable phosphor sheet S to the roller pair 66 while turning through 180° with the exposure surface of the stimulable phosphor sheet S being held out of contact with other members.

As shown in FIGS. 3 through 5, the roller pair 72 of the turning feed system 62 is associated with the guide means 76. The leading end of the stimulable phosphor sheet S fed from the roller pair 64 along the curved guide plates 68 into the curved feed path has a substantially central area thereof contacted and guided by the roller 84 of the guide means 76, so that the stimulable phosphor sheet S can smoothly be fed to the curved guide plates 70.

Specifically, since the stimulable phosphor sheet S is fed with its opposite longitudinal edges being gripped by the rubber rollers 78a, 78b, when the stimulable phosphor sheet S is fed into the curved feed path, the central region of the stimulable phosphor sheet S tends to bulge. As a result, the leading end of the stimulable phosphor sheet S fed from the curved guide plates 68 might not be gripped by the roller pair 72.

In the illustrated embodiment, the roller 84 of the guide means 76 is rotatably supported on the shaft 80a of the rollers 78a, and the substantially central region of the leading end of the stimulable phosphor sheet S fed from the curved guide plates 68 to the roller pair 72 is guided by the roller 84. Therefore, the opposite longitudinal marginal edges of the stimulable phosphor sheet S are reliably gripped by the rubber rollers 78a, 78b of the roller pair 72, so that the stimulable phosphor sheet S can smoothly be delivered to the curved guide plates 70.

Consequently, in the circulatory feed system 36 which employs only the opposite longitudinal marginal edges of the stimulable phosphor sheet S to deliver the stimulable phosphor sheet S, it is possible to feed the stimulable phosphor sheet S smoothly and reliably along the curved feed path. In the guide means 76, damper 86 disposed around the roller 84 (see FIGS. 3 through 5). The damper 86 made of a cushioning non-woven fabric is disposed around the roller 84 for direct contact with the stimulable phosphor sheet S. Therefore, the stimulable phosphor sheet S is protected against smear and damage and hence can be used effectively over a long period of time.

The roller 84 is rotatably supported on the shaft 80a by the bearing 82. When the stimulable phosphor sheet S comes into contact with the roller 84, the roller 84 can freely rotate on the shaft 80a, and does not cause damage to the stimulable phosphor sheet S due to friction.

The stimulable phosphor sheet S is fed along the turning feed system 62 to the roller pair 66 while turning through 180°, after which the stimulable phosphor sheet S is transferred by the rotating roller pair 66 to the vertical guide plate 87. The stimulable phosphor sheet S is then delivered to the auxiliary scanning feed means 46 of the image information reading unit 32 (see FIG. 2).

In the auxiliary scanning feed means 46, the first and second roller pairs 54, 56 are rotated by the motor 58. The stimulable phosphor sheet S is fed in the auxiliary scanning direction (downward direction) indicated by the arrow X while its opposite marginal edges are being gripped by the first and second roller pairs 54, 56.

At this time, the laser beam applying means 48 emits a laser beam L which travels downwardly and is then directed substantially horizontally in the direction indicated by the arrow Y by the optical system 50. The laser beam L is applied to scan the exposure surface of the stimulable phosphor sheet S in the main scanning direction. When the laser beam L is applied to the stimulable phosphor sheet S, the exposure surface of the stimulable phosphor sheet S emits light, which is collected by the light guide 52 and then photoelectrically read by the non-illustrated photomultiplier.

When the recorded radiation image information is read from the stimulable phosphor sheet S by the image information reading unit 32, the leading end of the stimulable phosphor sheet S is guided by the curved guide plates 88, 90 and fed downwardly and then upwardly by the roller pair 94. After the radiation image information is fully read from the stimulable phosphor sheet S, the trailing end of the stimulable phosphor sheet S is delivered to a position near the roller pair 94. The roller pair 94 is then reversed by the motor 92.

The stimulable phosphor sheet S is fed horizontally along the guide plate 96 with its exposure surface facing downwardly, after which the stimulable phosphor sheet S is fed upwardly along the curved guide plate 98. The motor 104 rotates the roller pair 108 to feed the stimulable phosphor sheet S upwardly along the guide plate 100. The erasing light sources 60 of the erasing unit 34 are energized to erase any remaining radiation image information from the stimulable phosphor sheet S. The stimulable phosphor sheet S from which the remaining radiation image information has been erased remains positioned in the standby mode in the erasing unit 34.

In the illustrated embodiment, the radiation image information reading apparatus 20 repeatedly records radiation image information on and reads radiation image information from the stimulable phosphor sheet S as it is circulated in the main assembly 26. However, the present invention is easily applicable to an apparatus which does not have the exposure unit 30, but which can removably be loaded with a cassette containing exposed stimulable phosphor sheets. The principles of the present invention are also applicable to a feed system for feeding various image recording mediums such as an X-ray film or the like rather than the stimulable phosphor sheet S.

The image recording medium feeding device according to the present invention has the guide means with the damper positioned in the curved feed path for guiding the image recording medium in contact with the substantially central region thereof while the image recording medium is being fed using its opposite longitudinal marginal edges. Therefore, when the image recording medium is fed into the curved feed path, the central region thereof which is not supported by the feed system is reliably prevented from being bulging, and hence the image recording medium is easily and smoothly fed along the curved feed path.

Consequently, an image-recorded area of the image recording medium is protected against smear and damage by a relatively simple arrangement, and the image recording medium can smoothly and reliably be fed along a desired feed path.

Although a certain preferred embodiment of the present invention has been shown and described in detail, it should be understood that various changes and modifications may be made therein without departing from the scope of the appended claims.

What is claimed is:

1. An image recording medium feeding device comprising:
  a feed system for feeding an image recording medium using opposite longitudinal marginal edges thereof, which are an image-free area; and
  guide means positioned in a curved feed path for contacting a substantially central area of said image recording medium fed by said feed system and guiding said image recording medium along said curved feed path.

2. An image recording medium feeding device according to claim 1, wherein said guide means comprises a rotatable roller and a damper disposed therearound.

3. An image recording medium feeding device according to claim 2, wherein said feed system Includes a roller pair for gripping said opposite longitudinal marginal edges of said image recording medium to feed the image recording medium, said roller pair having a shaft, said roller being rotatably mounted on said shaft.

4. An image recording medium feeding device according to claim 1, wherein said feed system comprises:

curved guide members for guiding the opposite longitudinal marginal edges of said image recording medium; and a roller pair disposed above said curved guide plates for gripping said opposite longitudinal marginal edges of said image recording medium, said roller pair having a shaft;

said guide means comprising a roller rotatably mounted on said shaft by a bearing.

5. An image recording medium feeding device according to claim 4, wherein said guide means further comprising a damper disposed around said roller.

6. An image recording medium feeding device according to claim 1, wherein said image recording medium comprises a stimulable phosphor sheet.

* * * * *